US012470672B1

(12) United States Patent
Jiang et al.

(10) Patent No.: US 12,470,672 B1
(45) Date of Patent: Nov. 11, 2025

(54) MONITORING PLANT GROWTH CONDITIONS BY COUPLING NEAR SURFACE AND REMOTE SENSING IMAGERIES (71) Applicant: The Board of Trustees of the University of Illinois, Urbana, IL (US)

(72) Inventors: Chongya Jiang, Urbana, IL (US); Kaiyu Guan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 141 days.

(21) Appl. No.: 18/045,351

(22) Filed: Oct. 10, 2022

Related U.S. Application Data (60) Provisional application No. 63/262,273, filed on Oct. 8, 2021.

(51) Int. Cl.
*H04N 7/18* (2006.01)
*A01G 7/00* (2006.01)
*B64D 47/08* (2006.01)
*H04N 23/695* (2023.01)
*H04N 23/90* (2023.01)

(52) U.S. Cl.
CPC .............. *H04N 7/181* (2013.01); *A01G 7/00* (2013.01); *H04N 23/695* (2023.01); *H04N 23/90* (2023.01); *B64D 47/08* (2013.01)

(58) Field of Classification Search
CPC ...... H04N 7/181; H04N 23/695; H04N 23/90; A01G 7/00; B64D 47/08
USPC .......................................... 348/144
See application file for complete search history.

(56) References Cited

U.S. PATENT DOCUMENTS

| 4,683,496 A | 7/1987 | Tom |
| 8,406,554 B1 | 3/2013 | Saha et al. |
| 8,705,887 B2 | 4/2014 | Ma et al. |
| 9,396,528 B2 | 7/2016 | Pacifici |
| 9,875,430 B1 | 1/2018 | Keisler et al. |
| 2010/0149381 A1 | 6/2010 | Motomura et al. |
| 2013/0250104 A1 | 9/2013 | Williams |
| 2014/0201667 A1 | 7/2014 | Schoeberl |
| 2017/0323426 A1 | 11/2017 | Johannesson |
| 2019/0114744 A1 | 4/2019 | Albrecht et al. |

(Continued)

FOREIGN PATENT DOCUMENTS

| CN | 104915674 B | 12/2018 |
| CN | 113408374 B | 9/2022 |

(Continued)

*Primary Examiner* — Thai Q Tran
*Assistant Examiner* — Nienru Yang
(74) *Attorney, Agent, or Firm* — McKee, Voorhees & Sease, PLC (57) ABSTRACT One or more cameras or other image collecting devices are used at or near the surface of a field including crops to acquire images of the crop canopy. This can be done by tilting the cameras relative to the zenith. Additional imagery, such as airborne or satellite of the same crop canopies is also acquired, with at least some of the imagery having similar geographical and time-stamped information. A machined-learning model will take the near surface imagery and be trained to apply the information to the remote imagery of the air or satellite to be applied to a greater area, which provides plant growth information to the wide area of the remote imagery.

20 Claims, 6 Drawing Sheets (56) References Cited

U.S. PATENT DOCUMENTS

| | | | |
|---|---|---|---|
| 2019/0188223 A1* | 6/2019 | De Sheng Deng | G06F 16/55 |
| 2019/0212191 A1* | 7/2019 | Schillings | G01J 1/4228 |
| 2020/0034949 A1 | 1/2020 | Van Niekerk et al. | |
| 2020/0065946 A1 | 2/2020 | Nagare et al. | |
| 2020/0396976 A1* | 12/2020 | Aronov | A01G 7/00 |
| 2021/0090274 A1* | 3/2021 | Fu | A01M 7/0042 |
| 2021/0118097 A1 | 4/2021 | Guan et al. | |
| 2022/0061236 A1 | 3/2022 | Guan et al. | |
| 2022/0215659 A1 | 7/2022 | Melaas et al. | |
| 2022/0292429 A1 | 9/2022 | Quinn et al. | |

FOREIGN PATENT DOCUMENTS

| | | |
|---|---|---|
| CN | 114118679 B | 9/2022 |
| EP | 3125158 A2 | 2/2017 |
| KR | 101844678 B1 | 4/2018 |
| WO | 2008051207 A2 | 5/2008 |

* cited by examiner

MONITORING PLANT GROWTH CONDITIONS BY COUPLING NEAR SURFACE AND REMOTE SENSING IMAGERIES

CROSS REFERENCE TO RELATED APPLICATIONS

This application claims priority under 35 U.S.C. § 119 to provisional patent application U.S. Ser. No. 63/262,273, filed Oct. 8, 2021. The provisional patent application is herein incorporated by reference in its entirety, including without limitation, the specification, claims, and abstract, as well as any figures, tables, appendices, or drawings thereof.

STATEMENT REGARDING FEDERALLY SPONSORED RESEARCH OR DEVELOPMENT

This invention was made with government support under DE-SC0018-420 awarded by the Department of Energy. The government has certain rights in the invention.

FIELD OF THE INVENTION

The subject disclosure relates generally to monitoring plant growth conditions using near surface and remote sensing imageries. In one specific example, the subject disclosure relates to monitoring plant growth conditions using below-canopy imagery, above-canopy imagery, and remote sensing imagery.

BACKGROUND OF THE INVENTION

Understanding terrestrial ecosystem change in the context of climate change is one of the biggest challenges facing earth science today. A key reason for our lack of understanding of the terrestrial ecosystem change is the scarcity of comprehensive and detailed earth observations. Conventional earth observation strategy highly depends on remote sensing, but remote sensing itself measures electromagnetic waves, and relevant models/algorithms are needed to convert remote sensing signals to ecosystem variables. Spatio-temporally-representative ground truth data of ecosystem variables are prerequisite to developing, evaluating, and improving those remote sensing models/algorithms. However, such data have usually been acquired at only a limited number of experimental sites during a limited time period due to the high cost of data collection.

Ground cameras can provide continuous observations of canopy structure and leaf color, and the Internet-of-things (IoT) technique further supports cameras to work in an intelligent manner. However, since plant growth conditions can vary largely within the field, these camera-collected vegetation data can only be considered as point level.

Satellite images can well capture the spatial heterogeneity within the field. By upscaling point-level vegetation data to multi-satellite images, field-level vegetation data can be obtained.

Therefore, there exists a need in the art to improve upon understanding of terrestrial ecosystem change that utilizes acquisition of data at ground or near ground and upscaling the data to account for larger ground areas.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to track crop productivity at field level in real time by collecting environment and vegetation data from ground and space and processing them using cutting-edge biophysical models.

It is still yet a further object, feature, and/or advantage to aid farmers for decision-making by providing accurate crop productivity estimation based on comprehensive and in-depth analysis of multi-source data. Existing solutions can only provide either low-level (e.g., weather) and low-accuracy ground or satellite data. Instead, aspects and/or embodiments disclosed will provide high-level (crop productivity) and high-accuracy information by integrating internet-of-things devices, multi-satellite images, and process-based models.

The system and/or methods disclosed herein can be used in a wide variety of applications. For example, the integrated solution can include IoT hardware and software, smartphones, airborne and satellite imageries, and online service based on cloud computing. It is a high-level integration of the existing techniques.

It is preferred the apparatus be safe, cost effective, and durable. The systems and/or methods can include installed IoT devices or mobile cameras in the field to collect environment and vegetation data and transfer them to cloud end in an automatic manner. These ground data, along with satellite data stored on the cloud, will be fused into process-based models for further analysis. High resolution crop growth condition maps will be generated and sent to farmers at daily interval.

According to some aspects of the present disclosure, a near surface device system for monitoring plant growth conditions comprises at least one tilted camera with comprising a field of view covering an area ranging from the zenith direction towards the horizon; and A processing system including a processor that facilitates performance of operations, the operations comprising: obtaining from the at least one tilted camera tilted images that depict a portion of a plant canopy covering an area ranging from the zenith direction towards the horizon; and delivering the tilted images to a non-transitory machine-readable storage.

According to at least some aspects of some embodiments disclosed, the at least one tilted camera obtains images of plant canopy from a position below the plant canopy; or the at least one tilted camera obtains images of plant canopy from a position above the plant canopy.

According to at least some aspects of some embodiments disclosed, the at least one tilted camera comprises a below-canopy camera that is movable along a surface to acquire images of plant canopy at a plurality of positions.

According to at least some aspects of some embodiments disclosed, the below-canopy camera is rotatable to acquire images of plant canopy from a plurality of orientations.

According to at least some aspects of some embodiments disclosed, the at least one tilted camera comprises an above-canopy camera that is movable along a surface to acquire images of plant canopy at a plurality of positions.

According to at least some aspects of some embodiments disclosed, the above-canopy camera is rotatable to acquire images of plant canopy from a plurality of orientations.

According to at least some aspects of some embodiments disclosed, the below-canopy camera is mounted to a tracked robot or vehicle, a wheeled robot or vehicle, or any first combination thereof.

According to at least some aspects of some embodiments disclosed, the above-canopy camera is mounted to a drone, a balloon, an airborne plane, or any second combination thereof.

According to at least some aspects of some embodiments disclosed, a plurality of below-canopy cameras are configured to acquire images of plant canopy at a plurality of positions; and a plurality of above-canopy cameras are configured to acquire images of plant canopy at a plurality of positions.

According to at least some aspects of some embodiments disclosed, a plurality of below-canopy cameras are mounted to a plurality of chassis on the ground; and the plurality of above-canopy cameras are mounted to a plurality of poles on the ground.

According to at least some aspects of some embodiments disclosed, the plurality of below-canopy cameras are handheld by a plurality of operators; and the plurality of above-canopy cameras are handheld by a plurality of operators.

According to at least some aspects of some embodiments disclosed, the at least one tilted camera comprises RGB cameras, near-infrared cameras, multi-spectral cameras, hyperspectral cameras, or any combination thereof.

According to additional aspects, a method comprises collecting a plurality of tilted near surface images of plant canopy from at least one near surface device, and collecting remote sensing data comprising one or more remote sensing images from at least one remote sensing platform, wherein geographic footprints and acquisition dates of said tilted near surface images and said one or more remote sensing images are at least partially overlapping; generating ecosystem variables from the tilted near surface images; for the overlapped geographic footprints and acquisition dates of the near surface images and the one or more remote sensing images, configuring models and relationships to estimate ecosystem variables using the generated ecosystem variables as ground truths, and using the one or more remote sensing images as input; and generating predictions of agroecosystem variables by applying the models or relationships over the whole or part of the geographic footprint of the remote sensing data.

According to at least some aspects of some embodiments disclosed, the ecosystem variables comprise: leaf area index; plant area index; fraction of green leaves; fraction of plant cover; average leaf angle; clumping index; fraction of absorbed photosynthetically active radiation by plants; fraction of absorbed photosynthetically active radiation by green leaves; chlorophyll content; nitrogen content; above ground biomass; crop growth stage; crop stress, disease condition, or any combination thereof.

According to at least some aspects of some embodiments disclosed, the models and relationships comprise physics-based canopy radiative transfer models or radiative transfer based machine learning models for the ecosystem variables, statistical, machine learning, deep learning, computer vision, physics, or other models.

According to still additional aspects and/or embodiments a computer-implemented method for monitoring plant growth conditions comprises obtaining a plurality of tilted, near surface images of plant canopy from at least one near surface device; obtaining a plurality of remote images of plant canopy from a remote device; generating a set of geographic footprints and acquisition dates for both the plurality of the tilted, near surface images and the plurality of remote images; training a model using an overlapped value of the geographic footprints and acquisition dates of the tilted, near surface images and the plurality of remote images; processing the plurality of remote images of plant canopy using the trained model to predict plant growth conditions for the remote images of plant canopy.

According to at least some aspects of some embodiments disclosed, the at least one near surface device comprises at least one camera positioned at an angle relative to a zenith of the plant canopy.

According to at least some aspects of some embodiments disclosed, the remote device comprises a satellite capable of obtaining imagery.

According to at least some aspects of some embodiments disclosed, the method further comprising associating ecosystem variables with the obtained plurality of tilted, near surface images.

According to at least some aspects of some embodiments disclosed, the ecosystem variables comprise: leaf area index; plant area index; fraction of green leaves; fraction of plant cover; average leaf angle; clumping index; fraction of absorbed photosynthetically active radiation by plants; fraction of absorbed photosynthetically active radiation by green leaves; chlorophyll content; nitrogen content; above ground biomass; crop growth stage; crop stress, disease condition, or any combination thereof.

According to at least some aspects of some embodiments disclosed, the step of training the model comprises identifying pixels in the tilted, near surface images, associating ecosystem variables within the pixels, and upscaling the pixels to the area covered by the remote sensing images.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Various embodiments of the subject disclosure relate to integration of Internet-of-things (IoT) devices, smartphone apps, multi-satellite images, and cloud computation to intelligently monitor plant growth conditions. Such embodiments are sometimes referred to herein as "CropEYEs".

Figure 1:
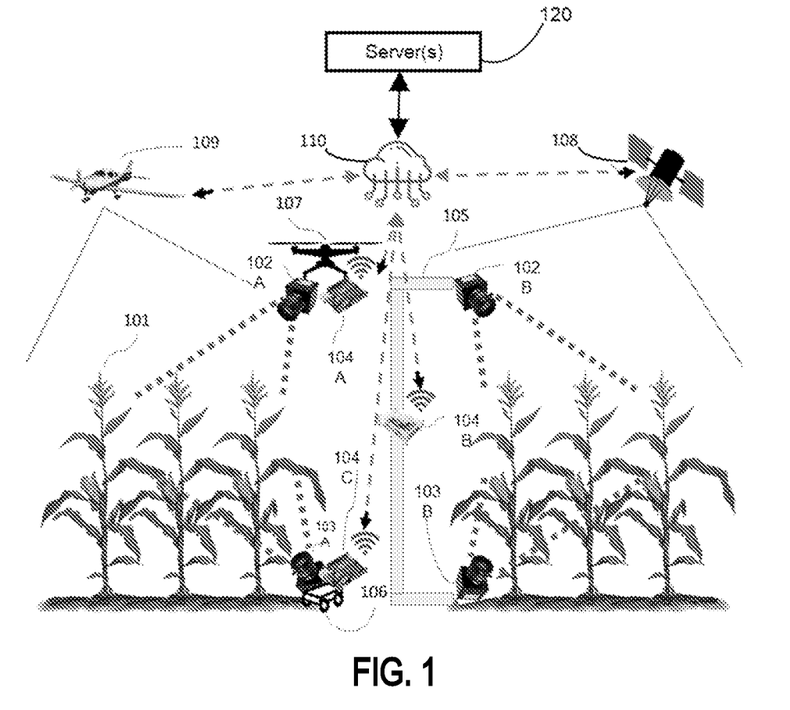
FIG. 1 is a depiction of a diagram of a system according to one or more aspects of one or more embodiments of the present disclosure.

Referring now to FIG. 1, a diagram depicting system 100 according to an embodiment is shown. In this example, the system 100 operates in the context of a field of crops 101 (see the six vertically growing crops depicted in the example of this figure, which crops will be referred to herein collectively using the call-out number 101). In various examples, the field of crops 101 can be any agricultural ecosystem. Located within the field of crops 101 is support structure 105. In one example, support structure 105 is permanently located within the field of crops 101. In another example, support structure 105 is temporarily located within field of crops 101. Of course, while one support structure 105 is shown in this example, any desired number of support structures can be utilized.

Still referring to FIG. 1, an imaging unit 102B (e.g., a camera or the like) is fixed to support structure 105 at a location above a canopy formed by field of crops 101. In one example, imaging unit 102B is located above all of the canopy. In another example, imaging unit 102B is located above at least some of the canopy. Further, an imaging unit 103B (e.g., a camera or the like) is fixed to support structure 105 at a location below the canopy formed by field of crops 101. In one example, imaging unit 103B is located below all of the canopy. In another example, imaging unit 103B is located below at least some of the canopy. Imaging unit 102B is in bi-directional communication with a transceiver 104B. The bi-directional communication between imaging unit 102B and transceiver 104B can be via wired communication, wireless communication, or any combination thereof. Further, imaging unit 103B is in bi-directional communication with transceiver 104B. The bi-directional communication between imaging unit 103B and transceiver 104B can be via wired communication, wireless communication, or any combination thereof. Further, transceiver 104B is in bi-directional communication with a network cloud 110 (e.g., comprising the Internet) via wired communication, wireless communication, or any combination thereof. One or more servers 120 can operate to communicate bi-directionally (e.g., via the Internet and transceiver 104B) with each of imaging units 102B, 103B to perform various functions described herein. In various examples, each of imaging units 102B, 103B can be mounted on respective articulated platforms such as to be remotely pointable (e.g., in azimuth and elevation). In various examples, the direction in which each of imaging units 102B, 103B is pointed can be controlled by the one or more servers 120. In various examples, each of imaging units 102B, 103B can be remotely zoomable (e.g., to have controllable field of view). In various examples, the field of view of each of imaging units 102B, 103B (e.g., the field of view of respective captured images) can be controlled by the one or more servers 120.

To use tilted cameras to collect ground truth data, we can mount cameras on mobile platforms, install them in the field, or carry them by humans. Specifically, it should be appreciated that aspects of the various embodiments can include the use of cellphone or other handheld applications to collect data, which can then be used to determine/acquire/obtain any of the information needed.

Any of the cameras described in the present disclosure can be RGB cameras, near-infrared cameras, multi-spectral cameras, hyperspectral cameras, or any combination thereof. Additionally, any other suitable camera and/or imaging unit/system could be used.

Still referring to FIG. 1, an imaging unit 102A (e.g., a camera or the like) is mounted to airborne carrier 107 that is flown above the canopy formed by field of crops 101. In one example, the airborne carrier can be a drone, which can be remote controlled or operated in an autonomous manner as an unmanned aerial vehicle (UAV). In one example, imaging unit 102A (and the airborne carrier 107) is located above all of the canopy. In another example, imaging unit 102A (and the airborne carrier 107) is located above at least some of the canopy. Further, an imaging unit 103A (e.g., a camera or the like) is mounted to ground carrier 106 at a location below the canopy formed by field of crops 101. In one example, imaging unit 103A is located below all of the canopy. In another example, imaging unit 103A is located below at least some of the canopy. In one example, the ground carrier 106 can be a ground robot (e.g., a tracked robot, a wheeled robot, controlled robot, autonomous vehicle, or the like). Imaging unit 102A is in bi-directional communication with transceiver 104A. The bi-directional communication between imaging unit 102A and transceiver 104A can be via wired communication, wireless communication, or any combination thereof. Further still, transceiver 104A is in bi-directional communication with network cloud 110 (e.g., comprising the Internet) via wired communication, wireless communication, or any combination thereof. Further, imaging unit 103A is in bi-directional communication with transceiver 104C. The bi-directional communication between imaging unit 103A and transceiver 104C can be via wired communication, wireless communication, or any combination thereof. Further still, transceiver 104C is in bi-directional communication with network cloud 110 (e.g., comprising the Internet) via wired communication, wireless communication, or any combination thereof. One or more servers 120 can operate to communicate bi-directionally (e.g., via the Internet and transceivers 104A, 104C) with each of imaging units 102A, 103A to perform various functions described herein. In various examples, the direction in which each of imaging units 102A, 103A is pointed can be controlled by one or more servers 120 (e.g., via directional control of each of airborne carrier 107 and ground carrier 106). In various examples, each of imaging units 102A, 103A can be remotely zoomable (e.g., to have controllable field of view). In various examples, the field of view of each of imaging units 102A, 103A (e.g., the field of view of respective captured images) can be controlled by the one or more servers 120.

Still referring to FIG. 1, a remote imaging unit (e.g., a camera or the like) is mounted to airplane 109 that is flown above the canopy formed by field of crops 101. In one example, the airplane 109 is flown above the field of crops 101 at an altitude above the airborne carrier 107. In one example, the airplane 109 (along with the remote imaging unit mounted thereto) is located above all of the canopy. In another example, the airplane 109 (along with the remote imaging unit mounted thereto) is located above at least some of the canopy. The remote imaging unit that is mounted to the airplane 109 is in bi-directional wireless communication with network cloud 110 (e.g., comprising the Internet). In another example, images captured by the remote imaging unit mounted to airplane 109 can be uploaded to the network cloud 110 via transfer from a memory card or the like. Further, a remote imaging unit (e.g., a camera or the like) is mounted to satellite 108 that is flown above (that is, significantly above) the canopy formed by field of crops 101. In one example, the satellite 108 is flown above the field of crops 101 at an altitude above the airplane 109. In one example, the satellite 108 (along with the remote imaging unit mounted thereto) is located above all of the canopy. In another example, the satellite 108 (along with the remote imaging unit mounted thereto) is located above at least some of the canopy. The remote imaging unit that is mounted to the satellite 108 is in bi-directional wireless communication with network cloud 110 (e.g., comprising the Internet). One or more servers 120 can operate to communicate bi-directionally (e.g., via the Internet) with each of the remote imaging units mounted to the airplane 109 and to the satellite 108 to perform various functions described herein. In various examples, the direction in which each of remote imaging units mounted to the airplane 109 and to the satellite 108 is pointed can be controlled by the one or more servers 120. In various examples, each of remote imaging units mounted to the airplane 109 and to the satellite 108 can be remotely zoomable (e.g., to have controllable field of view). In various examples, the field of view of each of remote imaging units mounted to the airplane 109 and to the satellite 108 (e.g., the field of view of respective captured images) can be controlled by the one or more servers 120.

Still referring to FIG. 1, while two above-canopy imaging units 102A, 102B are shown, any desired number of above-canopy imaging units can be utilized. Further, while two below-canopy imaging units 103A, 103B are shown, any desired number of below-canopy imaging units can be utilized. Further, while one airplane/remote imaging unit combination is shown, any desired number of airplane/remote imaging unit combinations can be utilized. Further still, while one satellite/remote imaging unit combination is shown, any desired number of satellite/remote imaging unit combinations can be utilized. Further still, it is noted that the airplane and satellite altitudes shown in FIG. 1 are not to scale, and the airplane can be flown at typical non-commercial heights (e.g., 1,000-5,000 feet) and the satellite can be flow at typical satellite heights. Further, in various examples, the field of views of the various imaging units can be (from broadest to narrowest): satellite-based, airplane-based, above-canopy, or below canopy. In one example, the field of view of each above-canopy imaging unit can be a same field of view. In one example, the field of view of each above-canopy imaging unit can be a different field of view. In one example, the field of view of each below-canopy imaging unit can be a same field of view. In one example, the field of view of each below-canopy imaging unit can be a different field of view.

Figure 2:
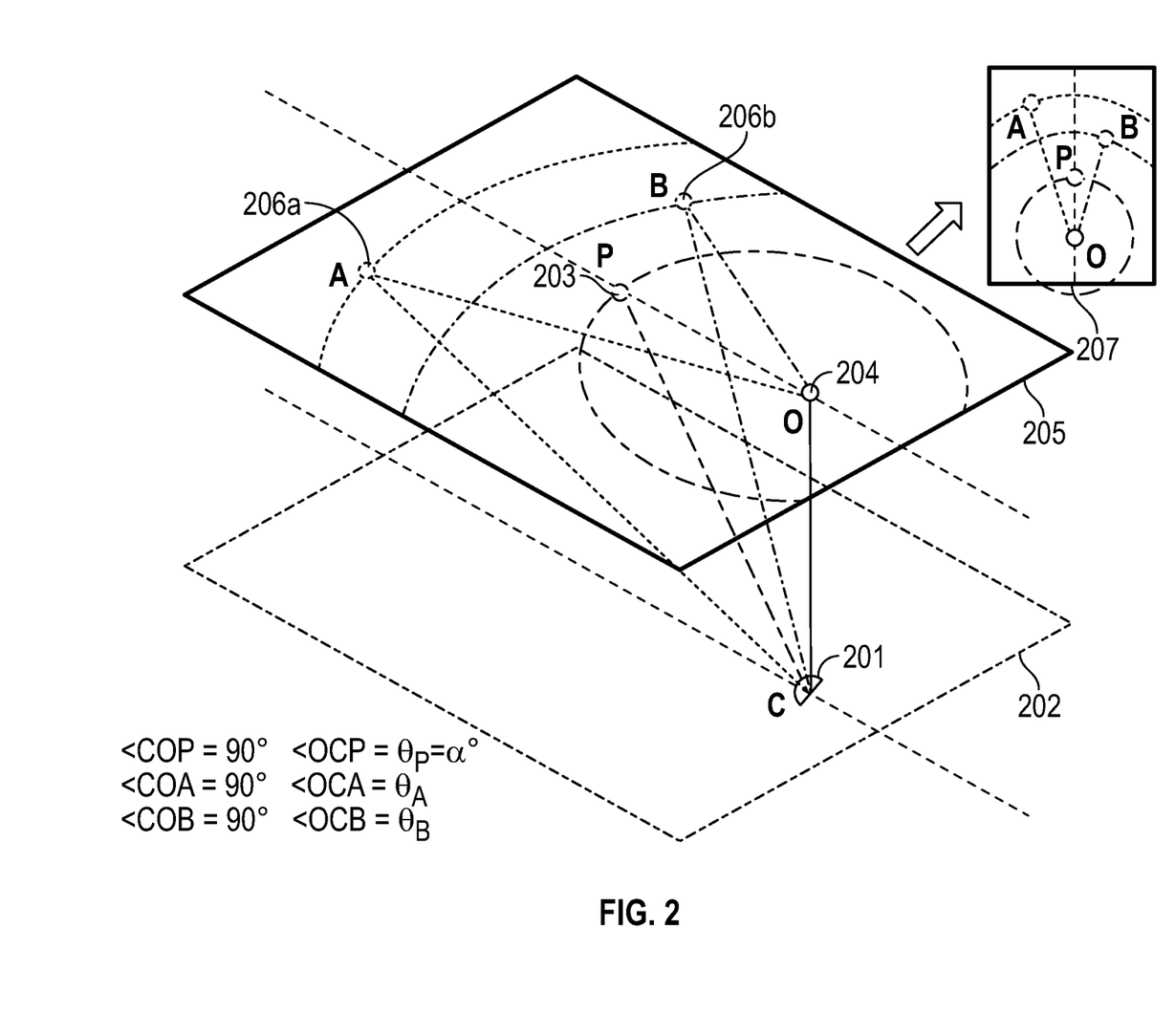
FIG. 2 is a depiction of another diagram of a system according to one or more aspects of one or more embodiments of the present disclosure.

Referring now to FIG. 2, a diagram depicting system 200 according to an embodiment is shown. The figure depicts a diagram illustrating multi-angular observations using a single below-canopy upward-viewing tilted camera. The below-canopy tilted camera 201 is mounted to a chassis on the ground 202, orientating to a direction 203 away from the zenith direction 204. Any targeted point in the scene, e.g., 203, 204, 206a and 206b, is associated with a view zenith angle, i.e., the angle between the zenith direction 204 and the line of sight from the camera 201 to the target point, ranging from 0°-90°. The acquired image 207, therefore, carries multi-angular information of the plant canopy.

Figure 3:
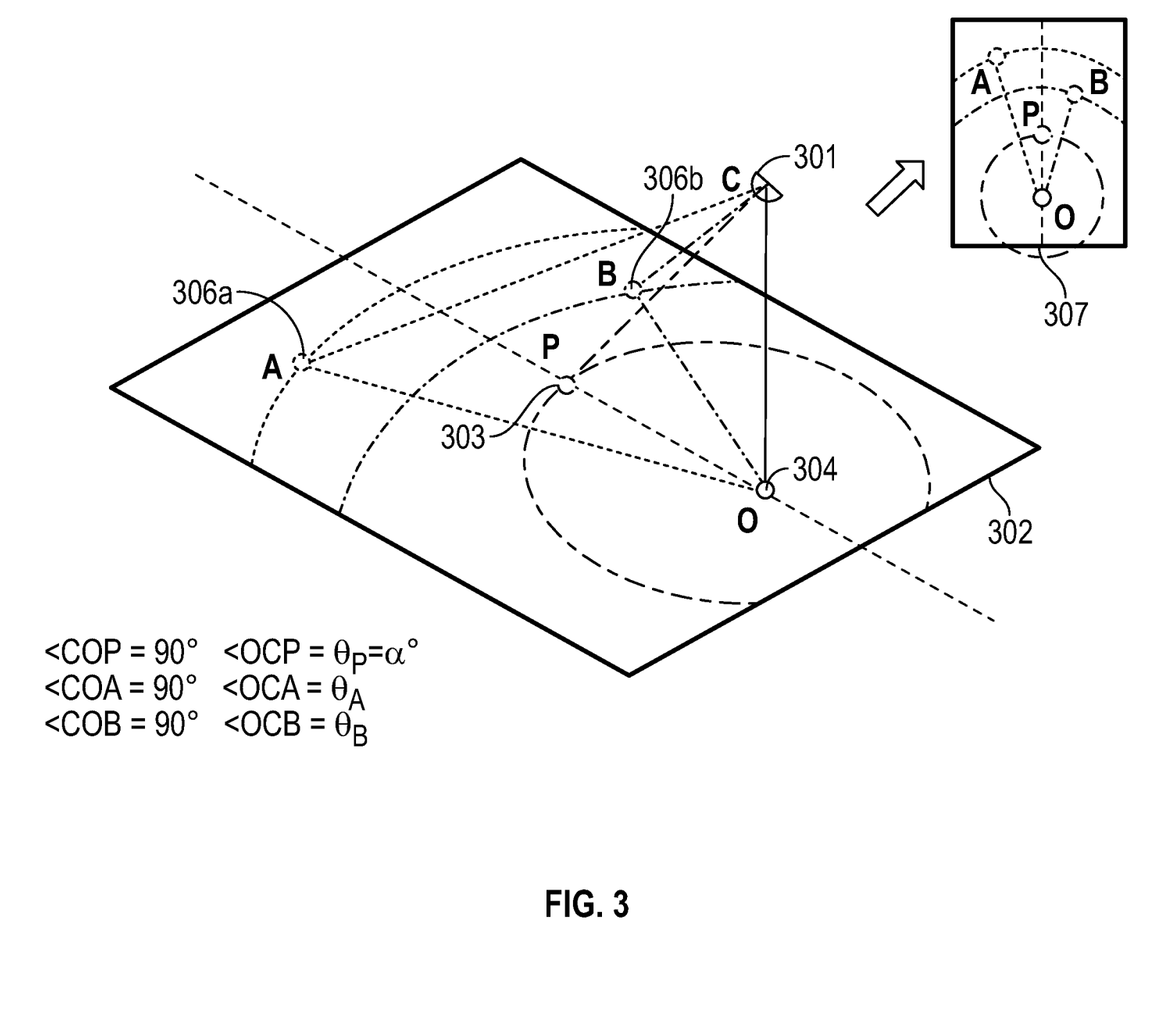
FIG. 3 is a depiction of another diagram of a system according to one or more aspects of one or more embodiments of the present disclosure.

Referring now to FIG. 3, a diagram depicting system 300 according to an embodiment is shown. This figure depicts a diagram illustrating multi-angular observations using a single above-canopy downward-viewing tilted camera. The above-canopy tilted camera 301 is mounted to a pole on the ground 302, orientating to a direction 303 away from the zenith direction 304. Any targeted point in the scene, e.g., 303, 304, 306a and 306b, is associated with a view zenith angle, i.e., the angle between the zenith direction 304 and the line of sight from the camera 301 to the target point, ranging from 0°-90°. The acquired image 307 therefore carries multi-angular information of the plant canopy.

Figure 4:
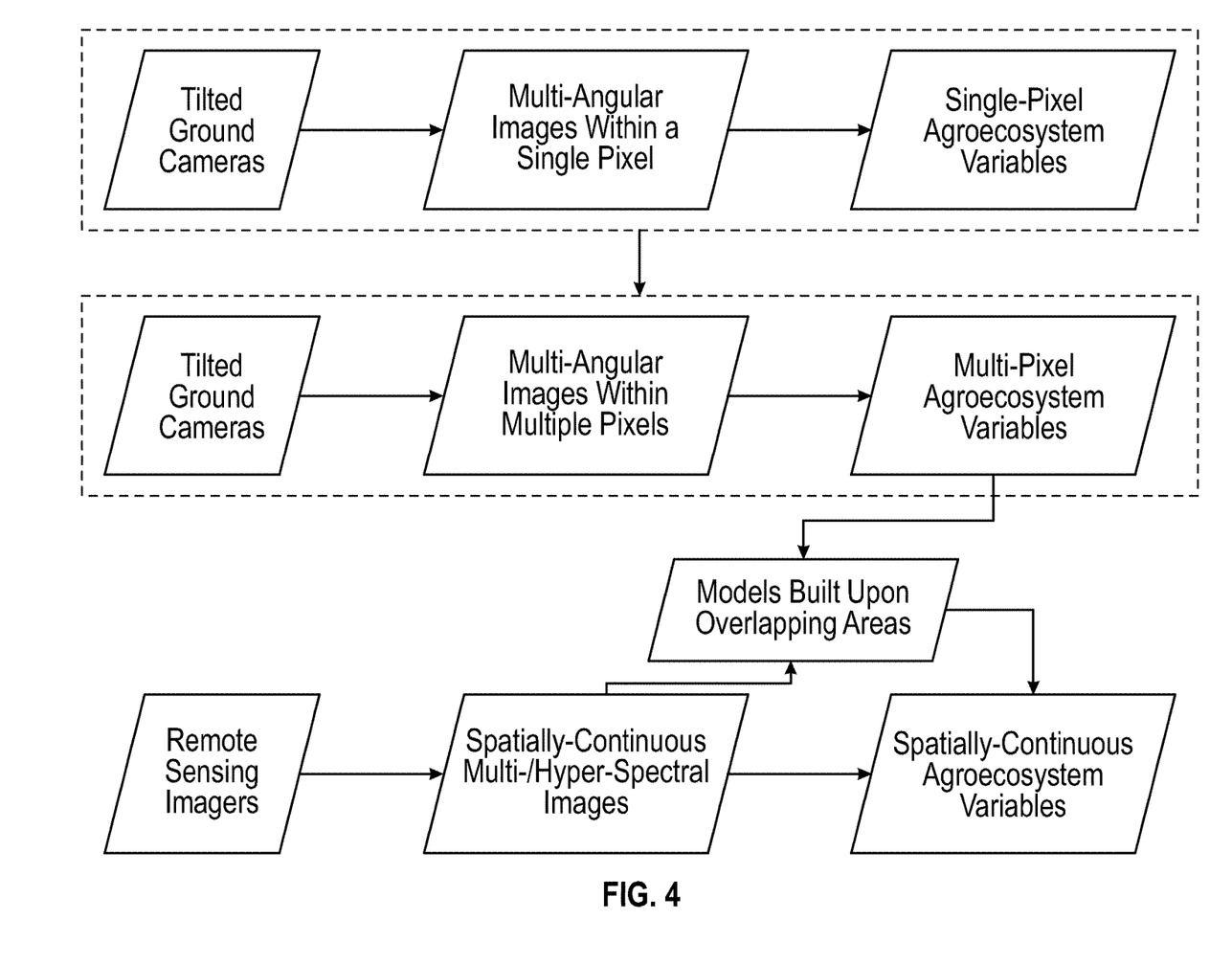
FIG. 4 is a depiction of a method according to one or more aspects of one or more embodiments of the present disclosure.
Figure 5:
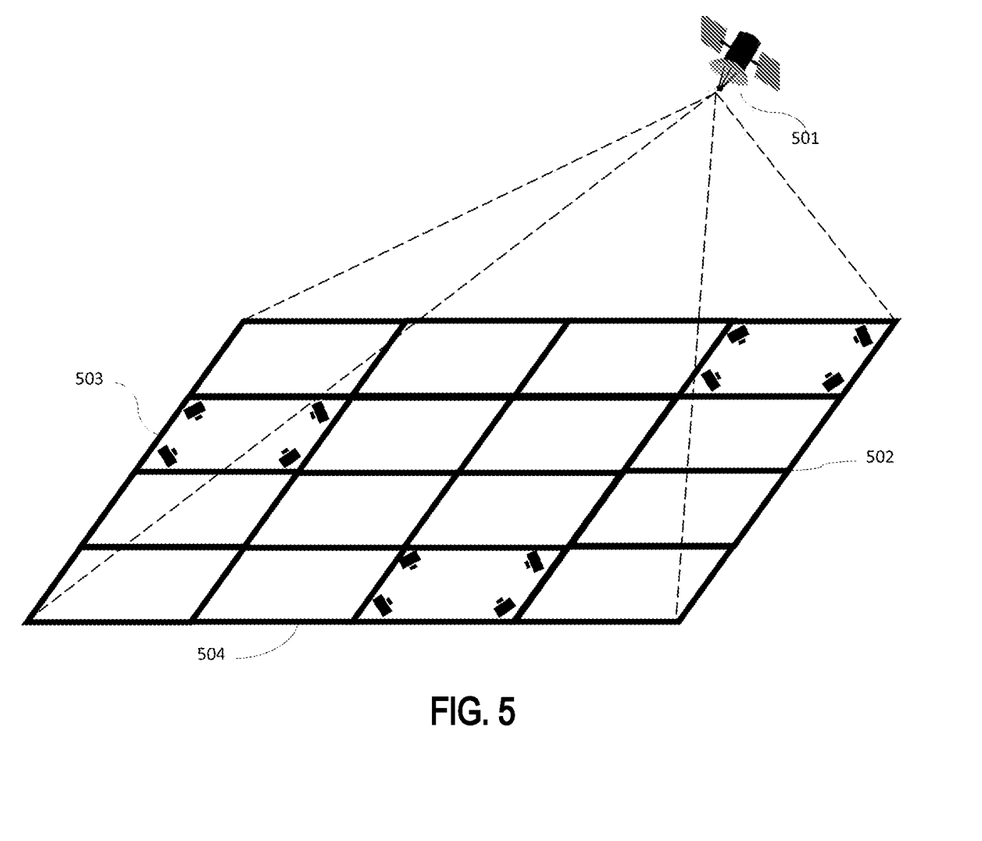
FIG. 5 is a depiction of a method according to one or more aspects of one or more embodiments of the present disclosure.
Figure 6:
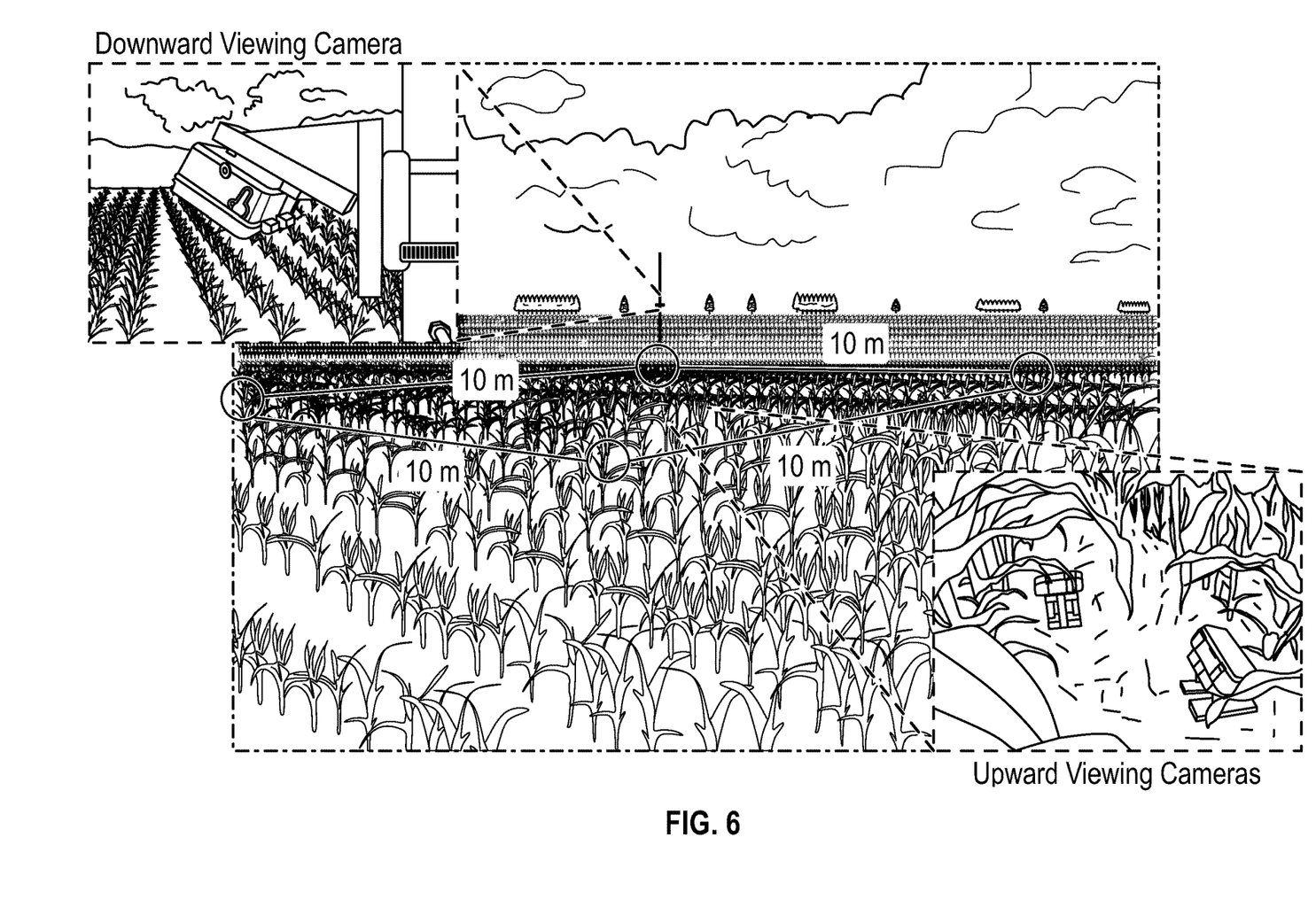
FIG. 6 is a depiction of a method according to one or more aspects of one or more embodiments of the present disclosure.

Referring now to FIG. 4, FIG. 5 and FIG. 6, various steps of a method 400 according to one or more embodiments are shown. The figure depicts a diagram depicting upscaling strategies. Within each pixel 503 of a remote sensing imagery 502 acquired from an aircraft platform 501, multiple near surface images are collected by at least one tilted ground camera. Ecosystem variables are derived from these images, which are representative for the satellite pixel. This process is repeated for multiple satellite pixels within the satellite images to derive ecosystem variables at these pixels. Relationships are built between satellite data and ecosystem variables over these sampled pixels, and then applied to the entire satellite image to derive maps of ecosystem variables.

With camera images, plant and background (sky for upward-viewing cameras and soil for downward-viewing cameras) are automatically separated, from which gap fractions of plant canopy at different angles θ can be calculated, and plant leaf area index, average leaf angle, and apparent clumping index can be calculated.

The indirect measurement methods for the analysis of canopy structure are based on the Beer-Lambert Law. Assuming plant leaves are randomly distributed, the attenuation of beam light by vegetation canopy in a specific direction is given by:

$$P_0(\theta) = e^{-k(\theta)L_e} = e^{\frac{G(\theta)L_e}{\cos\theta}} \tag{1}$$

where $P0(\theta)$ is the probability that the light has 0 contact with the vegetation canopy, i.e., gap fraction, at the VZA θ, $k(\theta)$ is the light extinction coefficient, $G(\theta)$ is the ratio of the projected leaf area on a plane perpendicular to the view direction to the leaf area, $L_e$ is the effective leaf area index ($LAI_{eff}$).

Eq. (1) directly links the measurable variable gap fraction with the target variable LAI. However, $G(\theta)$ is unknown and hard to acquire. A theorem has been proposed to estimate LAI from multi-angle gap fractions without a prior knowledge of $G(\theta)$:

$$L = 2\int_0^{\pi/2} -\overline{\ln P_0(\theta)} \cos\theta \sin\theta\, d\theta \tag{2}$$

With LAI and gap fraction, $G(\theta)$ can be retrieved from Eq. (1) by:

$$G(\theta) = \frac{-\overline{\ln P_0(\theta)}\cos\theta}{L} \tag{3}$$

An empirical polynomial fitting method has subsequently been developed to estimate ALA α:

$$\alpha = C_0 + C_1\frac{\partial G}{\partial\theta} + C_2\left(\frac{\partial G}{\partial\theta}\right)^2 + C_3\left(\frac{\partial G}{\partial\theta}\right)^3 + C_4\left(\frac{\partial G}{\partial\theta}\right)^4 + C_5\left(\frac{\partial G}{\partial\theta}\right)^5 \tag{4}$$

where Ck (k=0 . . . 5) are coefficients pre-fitted from the theoretical relationships between $G(\theta)$ and α.

Finally, to account for the non-random distribution of plant leaves, an apparent clumping index (ACI) Ω can be estimated by:

$$\Omega = \frac{\int_0^{\pi/2} -\ln\overline{P_0(\theta)}\cos\theta\sin\theta\,d\theta}{\int_0^{\pi/2} -\overline{\ln P_0(\theta)}\cos\theta\sin\theta\,d\theta} \tag{5}$$

where P(θ) is the gap fraction at the angle θ. Mean leaf angle and apparent clumping index can also be calculated in other ways.

The following equation can be used to determine and/or estimate plant area index (PAI):

$$PAI = 2\int_0^{\pi/2} -\ln\ln P(\theta)\cos\cos\theta\sin\sin\theta\,d\theta \tag{6}$$

Further, with reference to FIG. 6, green and yellow components are automatically identified from photos taken from downward-viewing cameras, from which fraction of green leaves and chlorophyll content are calculated.

As understood, any of the aspects of any of the embodiment shown can include the use of machine learning models. For example, the models can be used to upscale the ecosystem variables associated with the near surface, tilted images to be applied to the remote area covered by the remote device (e.g., the satellite). In order to perform such upscaling, the models are trained using the information from the near surface acquisition devices (e.g., the up or down facing cameras).

The models can be trained in a number of ways including statistical models, process-based models, and machine learning models. For example, the models can use machine learning (ML). A machine learning model is trained to identify the connection between historical feature values and historical training labels. Such machine-learned connections, referred to hereinafter as machine-learning models, between historical feature values and historical training labels can be "tested" using historical features and training labels that were not used in the training process. For example, every one out of ten years of historical data are held out (e.g., not used in the training process) to validate the performance of a machine-learnt connection. In this way, the best machine-learning model may be chosen among multiple models being validated. Moreover, a machine-learning model trained using historical feature values and historical training labels can be applied to current or future features to predict what should be the corresponding labels. Known algorithms for training a machine learning model that may be used according to various embodiments include, for example, supervised learning, unsupervised learning, statistical classification, association rule learning, hierarchical clustering, partitional clustering, reinforcement learning, and deep learning. The machine learning model may be a neural network, linear model, generalized additive model, random forest (e.g., ensemble method) model, gradient boosted regression model, or supported vector machine model, for example. In addition, the machine learning algorithm may be a weighted average of two or more of the algorithms mentioned above.

According to the present disclosure, the model of the remote images can be trained using the near surface images and associated ecosystem variables associated therewith. This can be broken down to the pixel level to obtain the best ground truth or near ground truth. The information is then used to train the model to be applied to the remote images, which can quickly and easily provide plant canopy information, including plant growth information, for a large area, e.g., an entire area covered by the satellite imagery of the satellite.

To aid in accomplishing the steps and features disclosed, the following may be included as part of the disclosure. In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The system as disclosed will preferably include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

As further noted herein, aspects of the disclosure can include wirelessly transmitting data, such as via cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Also as noted, the components of the system(s) as shown and/or described may include wired or wireless communications. This can be done by networks. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. From the foregoing, it can be seen that the invention accomplishes at least all of the stated objectives.

The invention can be used to monitor plant growth conditions in croplands, forests, grasslands, shrublands, and greenhouses.

What is claimed is:

1. A near surface system for monitoring plant growth conditions, comprising:
   at least one tilted camera comprising a field of view covering an area ranging from the zenith direction towards a horizon; and
   a processing system including a processor that facilitates performance of operations, the operations comprising:
      obtaining from the at least one tilted camera tilted images that depict a portion of a plant canopy covering an area ranging from the zenith direction towards the horizon; and
      delivering the tilted images to a non-transitory machine-readable storage;
   wherein the at least one tilted camera comprises a below-canopy upward-viewing camera, wherein the below-canopy upward-viewing camera is mounted at a location below the canopy to a permanent support structure on the ground or is mounted to a fully below-canopy ground carrier.

2. The system of claim 1, wherein:
   the at least one tilted camera obtains images of plant canopy from a position below the plant canopy; or
   the at least one tilted camera obtains images of plant canopy from a position above the plant canopy.

3. The system of claim 1, wherein:
   the below-canopy camera is movable along a surface to acquire images of plant canopy at a plurality of positions.

4. The system of claim 3, wherein:
   the below-canopy camera is rotatable to acquire images of plant canopy from a plurality of orientations.

5. The system of claim 4, wherein:
   the at least one tilted camera comprises an above-canopy camera that is movable along a surface to acquire images of plant canopy at a plurality of positions.

6. The system of claim 5, wherein:
   the above-canopy camera is rotatable to acquire images of plant canopy from a plurality of orientations.

7. The system of claim 6, wherein:
   the below-canopy camera is mounted to a tracked robot or vehicle, a wheeled robot or vehicle, or any first combination thereof.

8. The system of claim 7, wherein:
   the above-canopy camera is mounted to a drone, a balloon, an airborne plane, or any second combination thereof.

9. The system of claim 1, further comprising:
   a plurality of below-canopy cameras configured to acquire images of plant canopy at a plurality of positions; and
   a plurality of above-canopy cameras configured to acquire images of plant canopy at a plurality of positions.

10. The system of claim 9, wherein:
    the plurality of below-canopy cameras are mounted to a plurality of chassis on the ground; and the plurality of above-canopy cameras are mounted to a plurality of poles on the ground.

11. The system of claim 10, wherein:
the plurality of below-canopy cameras are handheld by a plurality of operators; and
the plurality of above-canopy cameras are handheld by a plurality of operators.

12. The system of claim 1, wherein the at least one tilted camera comprises RGB cameras, near-infrared cameras, multi-spectral cameras, hyperspectral cameras, or any combination thereof.

13. A method comprising:
collecting a plurality of tilted near surface images of plant canopy from at least one near surface device, and collecting remote sensing data comprising one or more remote sensing images from at least one remote sensing platform, wherein geographic footprints and acquisition dates of said tilted near surface images and said one or more remote sensing images are at least partially overlapping;
generating ecosystem variables from the tilted near surface images, the ecosystem variables comprising average leaf angle;
for the overlapped geographic footprints and acquisition dates of the near surface images and the one or more remote sensing images, configuring models and relationships to estimate ecosystem variables using the generated ecosystem variables as ground truths, and using the one or more remote sensing images as input; and
generating predictions of agroecosystem variables by applying the models or relationships over the whole or part of the geographic footprint of the remote sensing data.

14. The method of claim 13, wherein the ecosystem variables further comprise: leaf area index; plant area index; fraction of green leaves; fraction of plant cover; clumping index; fraction of absorbed photosynthetically active radiation by plants; fraction of absorbed photosynthetically active radiation by green leaves; chlorophyll content; nitrogen content; above ground biomass; crop growth stage; crop stress, disease condition, or any combination thereof.

15. The method of claim 13, wherein the models and relationships comprise physics-based canopy radiative transfer models or radiative transfer based machine learning models for the ecosystem variables, statistical, machine learning, deep learning, computer vision, physics, or other models.

16. A computer-implemented method for monitoring plant growth conditions, comprising:
obtaining a plurality of tilted, near surface images of plant canopy from at least one near surface device;
obtaining a plurality of remote images of plant canopy from a remote device comprising a satellite wherein the remote images are obtained via the satellite;
generating a set of geographic footprints and acquisition dates for both the plurality of the tilted, near surface images and the plurality of remote images;
training a model using an overlapped value of the geographic footprints and acquisition dates of the tilted, near surface images and the plurality of remote images, wherein said training does not involve use of a biological sensor positioned in, at, or near the geographic footprints of the tilted, near surface images or the geographic footprints of the plurality of remote images;
processing the plurality of remote images of plant canopy using the trained model to predict plant growth conditions for the remote images of plant canopy.

17. The method of claim 16, wherein the at least one near surface device comprises at least one camera positioned at an angle relative to a zenith of the plant canopy.

18. The method of claim 16, further comprising associating ecosystem variables with the obtained plurality of tilted, near surface images.

19. The method of claim 18, wherein the ecosystem variables comprise: leaf area index, plant area index; fraction of green leaves; fraction of plant cover; average leaf angle; clumping index; fraction of absorbed photosynthetically active radiation by plants; fraction of absorbed photosynthetically active radiation by green leaves; chlorophyll content; nitrogen content; above ground biomass; crop growth stage; crop stress, disease condition, or any combination thereof.

20. The method of claim 16, wherein the step of training the model comprises identifying pixels in the tilted, near surface images, associating ecosystem variables within the pixels, and upscaling the pixels to the area covered by the remote images.

* * * * *